United States Patent [19]

Kan et al.

[11] Patent Number: 4,923,959

[45] Date of Patent: May 8, 1990

[54] POLYAMINOBISIMIDE RESIN FROM BIS(ANILINO PROPYLENE) BENZENE

[75] Inventors: Kojiro Kan; Isao Kaneko, both of Chiba, Japan

[73] Assignee: Mitsui Petrochemical Industries, Inc., Tokyo, Japan

[21] Appl. No.: 268,439

[22] Filed: Nov. 8, 1988

[30] Foreign Application Priority Data

Nov. 13, 1987 [JP]  Japan ................................ 62-286757

[51] Int. Cl.$^5$ ............................................ C08G 73/10
[52] U.S. Cl. .................................. 528/322; 428/473.5;
428/474.4; 525/427; 528/170; 528/321
[58] Field of Search ................................ 528/322, 170

[56] References Cited

U.S. PATENT DOCUMENTS 4,526,838  7/1985  Fujioka et al. ...................... 528/322
4,654,407  3/1987  Domeier ............................. 528/322

*Primary Examiner*—Harold D. Anderson
*Attorney, Agent, or Firm*—Nixon & Vanderhye

[57] ABSTRACT

A polyaminobisimide resin composed of an unsaturated bisimide and a diamine which employs 1,3-bis and/or 1,4-bis(2-p-anilinopropylidene) benzene as a diamine component, when cured and used in a laminate, exhibit improved ply separation strength and water absorption.

3 Claims, No Drawings

POLYAMINOBISIMIDE RESIN FROM BIS(ANILINO PROPYLENE) BENZENE

BACKGROUND OF THE INVENTION

1. Field of the Invention

The present invention relates to polyaminobisimide resins, more particularly, to resins that use particular diamines that are capable of improving the physical properties of the cured products of the resins.

Polyaminobisimide resins are resins having high heat stability which are formed of unsaturated bisimides and diamines.

2. Discussion of Prior Art

Industrially, polyaminobisimide resins are commonly produced by using as an unsaturated bisimide the bismaleimide composed of maleic anhydride and methylenedianiline (MDA; also referred to as methylenebisaniline or 4,4'-diaminodiphenylmethane), and methylenedianiline as a diamine. After being cured to provide a three-dimensional structure, such resins exhibit superior heat stability by resisting thermal distortion. However, they incur such defects as brittleness and insufficient bonding strength which are evidenced by insufficient tensile strength and impact strength, and these defects are believed to originate from the excessive rigidity of the resins.

The physical properties that are required of the cured products of resin compositions to be used in laminates include not only good mechanical properties and high heat stability but also improved ply separation strength and copper foil bonding strength, as well as reduced water absorption. Reduction in water absorption is a particularly important objective since a smaller amount of water absorption will contribute higher reliability to electrical characteristics.

SUMMARY OF THE INVENTION

An object of the present invention is to provide a polyaminobisimide resin composed of an unsaturated bisimide and a diamine which employs 1,3-bis and/or 1,4-bis(2-p-anilinopropylidene) benzene as a diamine component so that it will, when cured and used in a laminate, exhibit improved ply separation strength and water absorption.

This object of the present invention can be attained by a polyaminobisimide resin that is composed of an unsaturated bisimide component and a diamine component, characterized in that 1,3-bis(2-p-anilinopropylidene) benzene represented by the following formula (I) and/or 1,4-bis(2-p-anilinopropylidene) benzene represented by the following formula (II) is used as the diamine component:

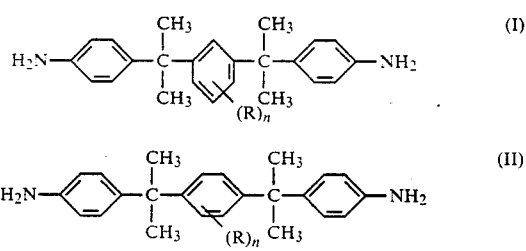

Where R stands for a halogen atom and/or an alkyl group, which can be the same or different, n a number from 0 to 4.

DETAILED DESCRIPTION OF THE INVENTION

The polyaminobisimide resin of the present invention is characterized in that 1,3-bis(2-p-anilinopropylidene) benzene represented by the following formula (I) and/or 1,4-bis(2-p-anilinopropylidene) benzene represented by the following formula (II) is used as a diamine component:

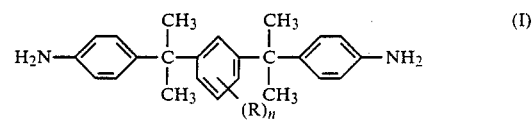

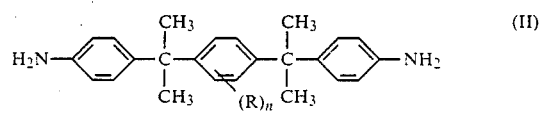

Where R stands for a halogen atom and/or an alkyl group, which can be the same or different, n a number from 0 to 4. When n equals 0, the aromatic group has no substituents.

The unsaturated bisimide used in the polyaminobisimide resin of the present invention is represented by the following formula (III):

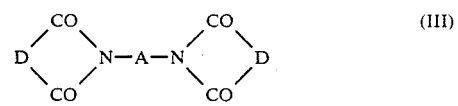

Where D is a divalent group having carbon-carbon double bond; and A is a divalent group having at least two carbon atoms.

In formula (III), A may be a linear or branched alkylene group having no more than 13 carbon atoms, an alkylene group in the form of a 5-or 6-membered ring, a hereto ring having at least one of O, N and S atoms, phenylene or a condensed ring containing aromatic hydrocarbon group. These groups may have substituents that will not cause any unwanted side reaction under the reaction conditions employed. In formula (III), A may be two or more phenylene groups, or two or more alicyclic groups that are coupled either directly or by way of a divalent atom or one or more of the radicals in the groups shown below:

The group of alkylene radicals having 1-3 oxygen, sulfur or carbon atoms, and the group consisting of the following radicals:

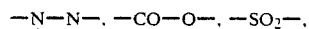

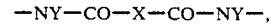

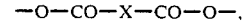

-continued

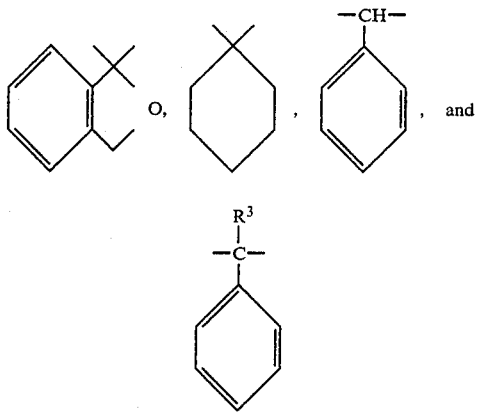

in which $R^3$, $R^4$ and Y each represents an alkyl group of $C_{1-4}$, and a cycloalkyl group in the form of a 5- or 6-membered ring, phenyl or a condensed ring aromatic hydrocarbon; X is a linear or a branched alkylene group having up to 13 carbon atoms, a cycloalkylene group in the form of a 5- or 6-membered ring, or a monocyclic or polycyclic arylene group.

In formula (III), D is derived from an ethylenic acid anhydride having the following formula (IV):

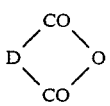 (IV)

Illustrative examples that may be represented by D include maleic anhydride, citraconic anhydride, tetrahydrophthalic anhydride, itaconic anhydride, and the product of the Diels-Alder reaction that occurs between cyclodiene and one of the anhydrides mentioned above.

Examples of preferred N,N'-bis-imide of formula (III) that may be employed in the present invention include the following:

maleic acid N,N'-ethylene-bis-imide, maleic acid N,N'-hexamethylene-bis-imide, maleic acid N,N'-methaphenylene-bis-imide, maleic acid N,N'-paraphenylene-bis-imide, maleic acid N,N-4,4'-diphenylmethane-bis-imide, maleic acid N,N'-4,4'-diphenylether-bis-imide, maleic acid N,N'-4,4'-diphenylsulfone-bis-imide, maleic acid N,N'-4,4'-dicyclohexylmethane-bis-imide, maleic acid N,N'-α,α'-4,4'-dimethylenecyclohexane-bis-imide, maleic acid N,N'-methaxylylene-bis-mide, and maleic acid N,N'-diphenylcyclohexane-bis-imide.

The molar ratio of the unsaturated bisimide of formula (III) to the diamine of formula (I) and/or formula (II) ranges generally from 1.2:1 to 50:1, preferably from 1.3:1 to 5:1. This condition should be satisfied in order to provide a cured product having superior heat stability.

The polyaminobisimide resin of the present invention, which contains the unsaturated bisimide component and diamine component described above, may be copolymerized with epoxy resins, phenolic resins, aniline resins, polychloroethylene resins, etc. or may be blended therewith to form resin compositions, subject to the condition that the incorporation of these additional components should not alter the basic properties of the polyaminobisimide resin.

This resin may also be formulated as a resin composition containing reactive diluents such as vinyl monomers, reaction accelerators such as organic peroxides, or some other suitable additives.

Also inorganic fillers may be used which include fused silica (amorphous), crystalline silica, alumina and a mixture thereof. These fillers may be used as a blend thereof with another filler such as titanium dioxide, mica, calcium carbonate, talc, aluminum hydroxide, cordierite, boron nitride, silicon carbide, and glass fibers.

An advantageous process for producing the novel resin of the present invention may proceed as follows: a diamine of formula (I) and/or formula (II), and unsaturated bisimide of formula (III) and any other necessary components fare mixed, and the mixture is heated at a suitable temperature in the range of 100°-250° C. for a period of several minutes to several hours so as to make a prepolymer. If desired, the prepolymer may be prepared in a polar solvent such as dimethylformamide or N-methylpyrrolidone. Alternatively, suspensions in other solvents may be employed. The resin of the present invention may also be prepared in the form of a block by heating a kneaded mixture of the diamine and unsaturated bisimide.

The resulting resin may be used as a solution or suspension. It may be shaped by thermal casting or it may be used as a powder.

The resin of the present invention is preferably cured by heating at a temperature of from about 200° to about 250° C., optionally under pressure. The resulting cured product of the resin will neither melt nor dissolve. It is highly resistant to thermal distortion, has good dielectric properties, and is stable against chemicals.

This resin is particularly adapted for the manufacture of laminates and may be processed into prepregs or other useful elements together with fibrous or fine particulate fillers. Alternatively, the resin may be formed into shaped articles either on its own or together with other resins.

The following examples are provided for the purpose of further illustrating the present invention but are in no way to be taken as limiting.

In the examples and comparative examples that follow, prepolymers were prepared, dissolved in solvents to make varnish; fibers were then impregnated with the varnish and dried to make prepregs; the prepregs were sandwiched between copper foils to make laminates. The physical properties of the laminates were evaluated under the conditions described below. The results are shown in Table 1.

Evaluation Tests (1) Copper foil separation strength
Copper foils were peeled from the laminate to determine its strength under the conditions described in JIS C6481.

(2) Ply separation strength
Prepreg plies were delaminated to determine the strength of the laminate under the same conditions as those employed in the measurement of copper foil separation strength.

(3) Solder resistance
The laminate was in a solder bath at 300° C. for 5 minutes and the appearance of the laminate was visually inspected.

(4) Water absorption

Water absorption measurements were conducted under the following conditions.

D-24/23: Immersed in distilled water at 23° C. for 24 h.

D-1/100: Immersed in boiling distilled water at 100° C. for 1 h.

EXAMPLE 1

A 500-ml flask was charged with 55.5 g of 1,3-bis(2-p-anilino-propylidene) benzene (m.p.=115° C.) and the charge was melted by immersing the flask in an oil bath at 150° C. To the molten charge, 144.5 g of N,N'-4,4'-diphenylmethanebismaleimide (molar ratio, 2.5) was added and the two components were mixed for reaction for 20 minutes. The reaction mixture was transferred into a vat, which was placed in an air oven at 170° C. and heated for an additional 12 minutes to make a prepolymer.

The prepolymer was dissolved in N-methylpyrrolidone to make varnish. A glass cloth was impregnated with the varnish and dried at 160° C. for 12 minutes to prepare a prepreg. Nine plies of this prepreg were superposed, sandwiched between copper foils, and pressed at 10 kgf/m² with heating at 180° C. for 60 minutes so as to prepare a copper-clad laminate. The laminate was subsequently post-cured at 200° C. for 24 h.

COMPARATIVE EXAMPLE 1

A laminate was prepared as in Example 1 (molar ratio of unsaturated bisimide component to diamine component=2.5:1) except that 1,3-bis(2-p-anilinopropylidene) benzene was replaced by methylenedianiline.

EXAMPLE 2

A 500-ml flask was charged with 64.9 g of 1,3-bis(2-p-anilinopropylidene) benzene and the charge was melted by immersing the flask in an oil bath at 150° C. To the molten charge, 135.1 g of N,N'-4,4'-diphenylmethanebismaleimide (molar ratio, 2.0) was added and the two components were mixed for reaction for 20 minutes. The reaction mixture was transferred into a vat, which was placed in an air oven at 170° C. and heated for 15 minutes to make a prepolymer.

The prepolymer was dissolved in N-methylpyrrolidone to make varnish. A glass cloth was impregnated with the varnish and dried at 160° C. for 12 minutes to prepare a prepreg. Nine plies of this prepreg were superposed, sandwiched between copper foils, and pressed at 10 kgf/m² with heating at 180° C. for 60 minutes so as to prepare a copper-clad laminate. The laminate was then post-cured at 200° C. for 24 hours.

A laminate was prepare as in Example 2 (molar ratio of unsaturated bisimide component to diamine component=2.0:1) except that 1,3-bis(2-p-anilinopropylidene) benzene was replaced by methylenedianiline.

TABLE 1

| Run No. | Copper foil peel strength (kgf/cm) | Inter-laminar peel strength (kgf/cm) | Solder resistance (300° C. × 5 min) | Water absorption (%) | |
|---|---|---|---|---|---|
| | | | | D-24/23 | D-1/100 |
| Example 1 | 1.9 | 1.3 | O.K | 0.14 | 0.14 |
| Comparative Example 1 | 1.2 | 0.9 | O.K | 0.26 | 0.27 |
| Example 2 | 2.0 | 1.7 | O.K | 0.14 | 0.13 |
| Com- | 1.4 | 1.1 | O.K | 0.25 | 0.26 |

TABLE 1-continued

| Run No. | Copper foil peel strength (kgf/cm) | Inter-laminar peel strength (kgf/cm) | Solder resistance (300° C. × 5 min) | Water absorption (%) | |
|---|---|---|---|---|---|
| | | | | D-24/23 | D-1/100 |
| parative Example 2 | | | | | |
| Example 3 | 1.8 | 1.3 | O.K | 0.14 | 0.14 |

The resin of the present invention has the advantage that it provides a cured product having improved ply separation strength and water absorption characteristics over the polyaminobismaleimide resins that are currently available on the market.

Therefore, the polyaminobisimide resin of the present invention has the potential to find increasing use in the following fields of high technology:

(1) resins for use in the fabrication of multi-layered laminates in the CPU of a large-scale computer;

(2) shaped articles for use as gears and other sliding members; and (3) a variety of heat-resistant shaped parts.

EXAMPLE 3

A 500 ml flask was charged with 27.8 g of 1,3-bis(2-p-anilinopropylidene) benzene and 27.8 g of 1,4-bis (2-p-anilinopropylidene) benzene. The charge was melted by immersing the flask in an oil bath at 150° C. To the molten charge 144.5 g of N,N'-4,4'-diphenylmethane bismaleimide (molar ratio 2.5) was added and the three components were mixed for reaction for 20 minutes. The reaction mixture was transferred into a vat, which was placed in an air oven at 170° C. and heated for 15 minutes to prepare a prepolymer.

The prepolymer was dissolved in N-methylpyrrolidone to make varnish. A glass cloth was impregnated with the varnish and dried at 160° C. for 12 minutes to prepare a prepreg. Nine plies of this prepreg were superposed, sandwiched between copper foils, and pressed at 10 kgf/cm² while heating at 180° C. for 60 minutes so as to prepare a copper-clad laminate. The laminate was then post-cured at 200° C. for 24 hours.

The properties of the resultant laminate are shown in Table 1.

What is claimed is:

1. A polyaminobisimide resin consisting essentially of the polymeric reaction product of N,N'-4,4'-diphenylmethanebismaleimide and at least one diamine component selected from the group consisting of 1,3-bis(2-p-anilinopropylidene) benzene represented by the following formula (I) and 1,4-bis(2-p-anilinopropylidene) benzene represented by the following formula (II):

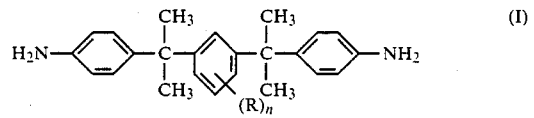

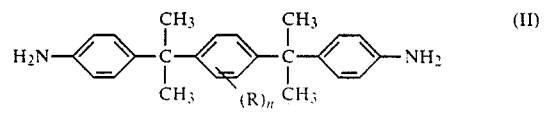

where each R represents a halogen atom or an alkyl group, which is the same or different, and n is a number from 0 to 4.

2. The polyaminobisimide resin of claim 1 in which the molar ratio of N,N'-4,4'-diphenylmethanebismaleimide to the diamine is in the range of from 1.2:1 to 50:1.

3. The polyaminobisimide resin of claim 1 in which the molar ratio of N,N'-4,4'-diphenylemethanebismaleimide to the diamine is in the range of from 1.3:1 to 5:1.

* * * * *